Oct. 13, 1925.

T. H. KRUSE 1,556,849

AUTO TIRE PROTECTOR

Filed Dec. 9, 1922

T. H. Kruse  Inventor

By C. A. Snow & Co.
Attorneys

Oct. 13, 1925.

T. H. KRUSE

AUTO TIRE PROTECTOR

Filed Dec. 9, 1922

T. H. Kruse Inventor

Patented Oct. 13, 1925.

1,556,849

UNITED STATES PATENT OFFICE.

THEODORE H. KRUSE, OF ARVADA, COLORADO.

AUTO TIRE PROTECTOR.

Application filed December 9, 1922. Serial No. 605,939.

*To all whom it may concern:*

Be it known that I, THEODORE H. KRUSE, a citizen of the United States, residing at Arvada, in the county of Jefferson and State of Colorado, have invented a new and useful Auto Tire Protector, of which the following is a specification.

This invention relates to signaling devices, to be employed in connection with pneumatic tires for signaling when the air pressure within a tire become dangerously low.

The primary object of the invention is to provide a device of this character which may be readily and easily applied to the usual wheel construction.

Another object of the invention is to provide a signaling device of this character which will be electrically controlled, the movable plunger forming a part of the device, being controlled by the air pressure within the tire.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
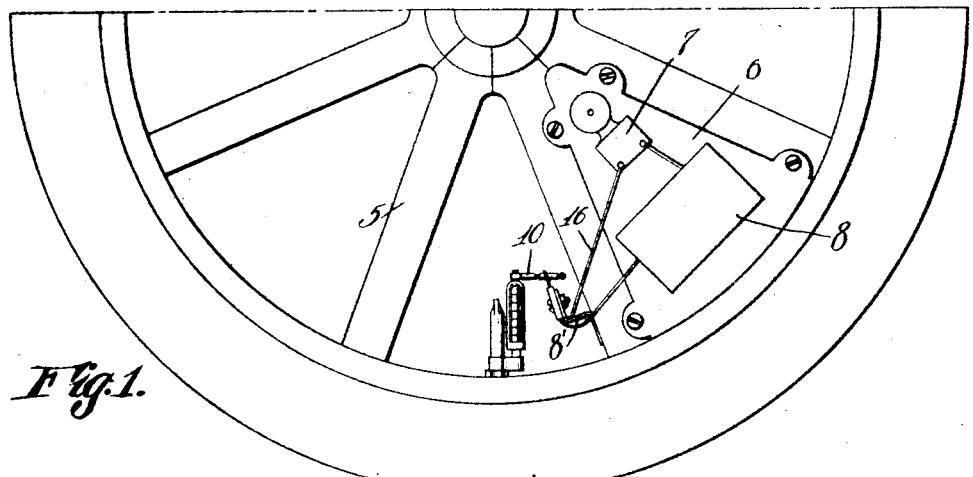
Figure 1 is a fragmental elevational view of a wheel provided with a pneumatic tire and disclosing the invention as applied thereto.
Figure 2:
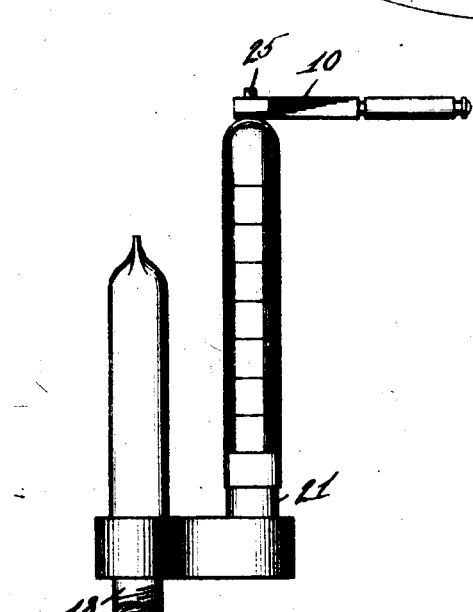
Figure 2 is an elevational view of the controlling plunger, the same being supplied with a contact arm.
Figure 3:
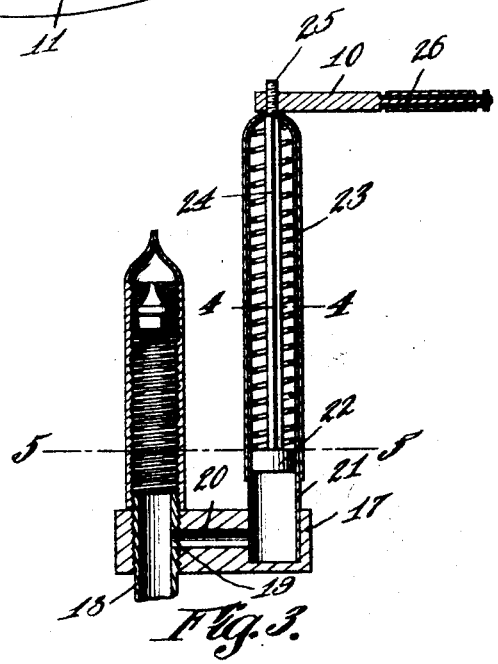
Figure 3 is a vertical sectional view through a plunger casing and valve dust cap.
Figure 4:
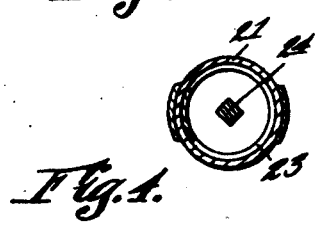
Figure 4 is a sectional view taken on line 4—4 of Figure 3.
Figure 5:
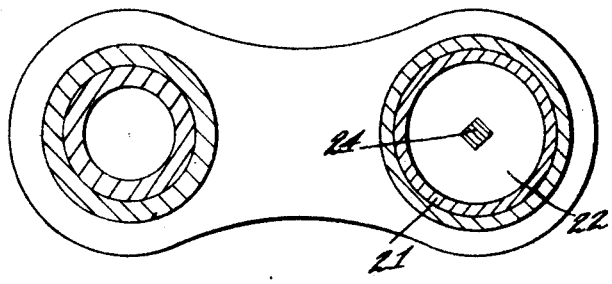
Figure 5 is a sectional view taken on line 5—5 of Figure 3.
Figure 6:
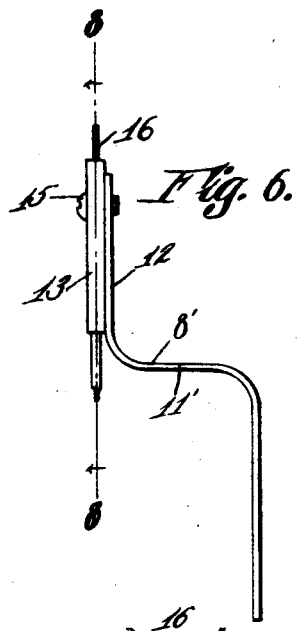
Figure 6 is a side elevational view of the stationary contact member.
Figure 7:
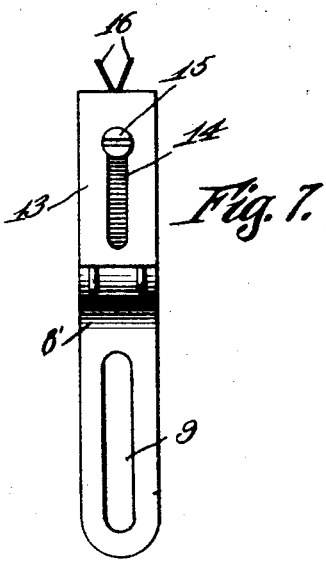
Figure 7 is a front elevational view of the stationary contact member.

Referring to the drawings in detail, the reference character 5 designates the spokes of a wheel, to which is secured the plate 6, the plate being substantially triangular in formation to properly fit over adjacent spokes. The plate 6 supports the signal 7, which may be in the form of an electrically controlled bell, or other suitable audible signaling device.

A battery indicated at 8 is also secured to the plate 6 in any suitable manner, and supplies the electric energy for accomplishing the sounding of the signaling device 7, suitable switch elements to be hereinafter more fully described, being provided for completing the circuit to the signaling device.

Secured to one of the spokes 5 is an arm 8 which is formed with an elongated opening 9 to accommodate a securing screw, whereby the arm 8 may be adjusted longitudinally of the spoke to which the same is secured, to bring the contact member carried by the arm to a point to be engaged by the movable contact member 10 at a period when the air pressure within the pneumatic tire 11 reaches a predetermined pressure.

This arm 8 is formed with a right angled portion 11 terminating in a relatively straight end portion 12 which provides a support for the movable contact member 13 which is in the form of a block of insulated material formed with an elongated opening to accommodate the set screw 15 that has one end thereof secured to the relatively straight portion 12 of the arm 8, whereby the block 13 may be adjusted.

Figure 8:
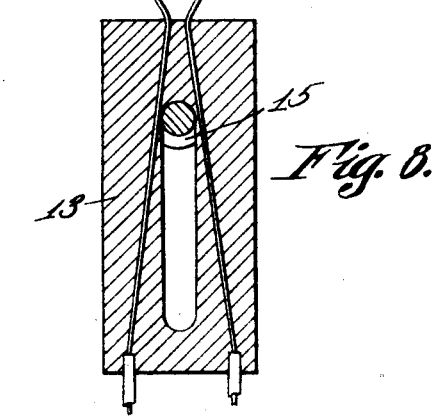
Figure 8 is a sectional view taken on line 8—8 of Figure 6.

Contact wires 16 are embedded in the block of insulated material 13 and have their upper extremities extended outwardly as clearly shown by Figure 8 of the drawings, so that the movable contact member 10 may move therebetween, to complete the circuit.

The wires 16 are shown as connecting the signaling device 7 and battery 8, and revolve with the wheel. The movable contact member embodies a base 17 which is formed with a threaded opening to be positioned over the valve stem 18, it being understood that the valve stem is formed with a lateral opening 19 communicating with the bore 20 of the base 17. Formed in the base 17 is an opening to accommodate the tubular member 21, which extends upwardly therefrom and in which is positioned the plunger 22, a coiled spring 23 being provided within the tubular member 21 and having one end thereof contacting with the plunger 22, for normally urging the plunger towards the base 17. A plunger rod 24 has connection with the plunger 22, the plunger rod being preferably square in cross section and designed to operate through a square opening in the upper end of the tubular member 21, thereby preventing rotation of the plunger within the tubular member 21 and insure a true vertical movement of the contact arm 10 carried thereby.

The movable contact member 10 is formed with a threaded opening to accommodate the threads 25 of the plunger 24 and as shown, this arm is provided with a section 26 formed of conductive material, so that when the member 26 contacts with the members 16, the circuit will be completed to the signaling device.

From the foregoing it will be seen that when a tire is inflated, the air pressure within the tire acts against the plunger 22 to move the contact member 10 towards the outer end of the tubular member 21, whereupon the same is out of contact with the wires 16.

It is obvious that as the air pressure within the tire 11 decreases, the pressure within the tubular member 21, will also decrease, to the end that the plunger 22 will move towards the base 17, simultaneously moving the contact member 10 towards the contact wire 16 to the end that when the contact member 26 engages the wires 16, the circuit is completed and the operator will be warned of the fact that the air pressure within the tire has reached a dangerously low degree.

Having thus described the invention, what is claimed as new is:—

1. A signaling device adapted for use in connection with the air valve of a pneumatic tire, said signaling device comprising a tubular member in communication with the tire valve, a rod operating in the tubular member and having its upper end extended through the upper end of the tubular member, a plunger on the lower end of the rod and adapted to be moved by air pressure within the valve, a coiled spring disposed between the plunger and upper end of the tubular member, and connected with the plunger rod, and said contact arm extending at right angles with respect to the rod.

2. A signaling device adapted for use in connection with the air valve of a pneumatic tire, said signaling device comprising a tubular member communicating with the air valve, a spring pressed plunger operating in the tubular member and adapted to be moved by air pressure in the air valve, a contact member extending laterally from the plunger, a block having an elongated opening mounted adjacent to the tubular member, a supporting arm adapted to be secured to a spoke adjacent to the tubular member, contact arms carried by the block to be engaged by the contact member to complete a circuit, and a bolt extending through the arm and elongated opening of the block to adjustably support the contact arms with respect to the contact member.

In testimony that I claim the foregoing as my own, I have hereto affixed my signature.

THEODORE H. KRUSE.